United States Patent
O'Connor et al.

(10) Patent No.: US 10,099,647 B2
(45) Date of Patent: Oct. 16, 2018

(54) AIRBAG ASSEMBLY

(71) Applicant: Ford Global Technologies, LLC, Dearborn, MI (US)

(72) Inventors: Chris Stephen O'Connor, Livonia, MI (US); Jacob Wookeun Lee, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 38 days.

(21) Appl. No.: 15/271,457

(22) Filed: Sep. 21, 2016

(65) Prior Publication Data

US 2018/0079383 A1    Mar. 22, 2018

(51) Int. Cl.
  *B60R 21/2338*   (2011.01)
  *B60R 21/205*    (2011.01)
  *B60R 21/013*    (2006.01)

(52) U.S. Cl.
  CPC ........ *B60R 21/2338* (2013.01); *B60R 21/205* (2013.01); *B60R 21/013* (2013.01); *B60R 2021/23382* (2013.01)

(58) Field of Classification Search
  CPC . B60R 21/2338; B60R 21/205; B60R 21/013; B60R 2021/23382
  See application file for complete search history.

(56) References Cited

U.S. PATENT DOCUMENTS

| | | |
|---|---|---|
| 5,344,184 A | 9/1994 | Keeler et al. |
| 5,511,850 A | 4/1996 | Coursey |
| 5,609,363 A | 3/1997 | Finelli |
| 5,865,467 A * | 2/1999 | Bito ............ B60R 21/231 280/728.1 |
| 5,947,510 A | 9/1999 | Athon et al. |
| 6,283,500 B1 | 9/2001 | Eckert et al. |
| 6,616,182 B2 | 9/2003 | Woolley et al. |
| 6,722,691 B1 | 4/2004 | Haland et al. |
| 6,951,348 B2 | 10/2005 | Enders |
| 6,966,579 B2 | 11/2005 | Schneider et al. |

(Continued)

FOREIGN PATENT DOCUMENTS

| | | |
|---|---|---|
| CN | 102806886 A | 12/2012 |
| DE | 10106661 A1 | 9/2002 |

(Continued)

OTHER PUBLICATIONS

UK Search Report dated Feb. 14, 2018 re GB Appl. No. 1714875.0.

(Continued)

*Primary Examiner* — Darlene P Condra
(74) *Attorney, Agent, or Firm* — Frank A. MacKenzie; Bejin Bieneman PLC

(57) ABSTRACT

An instrument-panel assembly in a vehicle includes an instrument panel extending along a longitudinal axis and an airbag supported by the instrument panel. The airbag is inflatable from an undeployed position to a deployed position. In two embodiments, the airbag includes a side extending in a direction transverse to the longitudinal axis and a tether attached to the side, and the side has a fold when the airbag is in the deployed position. Alternatively, in a third embodiment, the airbag in the deployed position has a tapered shape from a vertical perspective relative to the instrument panel at the instrument panel.

19 Claims, 5 Drawing Sheets

(56) References Cited

U.S. PATENT DOCUMENTS

| | | | |
|---|---|---|---|
| 6,983,954 B2 | 1/2006 | Sakaguchi | |
| 7,874,576 B2 | 1/2011 | Gandhi | |
| 8,246,074 B2 | 8/2012 | Choi et al. | |
| 9,180,834 B1 | 11/2015 | Le et al. | |
| 9,221,418 B1 | 12/2015 | Pline et al. | |
| 9,227,587 B1 | 1/2016 | Belwafa et al. | |
| 9,248,799 B2 | 2/2016 | Schneider et al. | |
| 9,333,940 B2 | 5/2016 | Hicken et al. | |
| 2002/0017774 A1 | 2/2002 | Igawa | |
| 2002/0036400 A1 | 3/2002 | Winters et al. | |
| 2005/0057029 A1 | 3/2005 | Thomas | |
| 2005/0127653 A1* | 6/2005 | Williams | B60R 21/233 280/743.2 |
| 2007/0252365 A1* | 11/2007 | Urushibata | B60R 21/233 280/729 |
| 2008/0079245 A1 | 4/2008 | Bito | |
| 2008/0211214 A1* | 9/2008 | Ishiguro | B60R 21/2338 280/736 |
| 2011/0140398 A1* | 6/2011 | Song | B60R 21/205 280/729 |
| 2013/0320656 A1* | 12/2013 | Yamada | B60R 21/2338 280/743.2 |
| 2014/0217712 A1* | 8/2014 | Nakamura | B60R 21/2338 280/739 |
| 2015/0084318 A1 | 3/2015 | Yamaji et al. | |
| 2015/0274116 A1 | 10/2015 | Jaradi et al. | |
| 2015/0307052 A1* | 10/2015 | Jaradi | B60R 21/231 280/743.2 |
| 2016/0031400 A1* | 2/2016 | Ruthinowski | B60R 21/206 280/743.1 |
| 2016/0221524 A1 | 8/2016 | Sekino et al. | |
| 2017/0158154 A1 | 6/2017 | Kobayashi et al. | |
| 2017/0282841 A1* | 10/2017 | Hayashi | B60R 21/239 |

FOREIGN PATENT DOCUMENTS

| | | |
|---|---|---|
| DE | 10325124 A1 | 12/2004 |
| DE | 102007032763 A1 | 1/2008 |
| EP | 1470970 A2 | 10/2004 |
| JP | 2008001198 A | 1/2008 |
| JP | 2014121965 A | 7/2014 |
| JP | 201637130 A | 3/2016 |
| JP | 201668848 A | 5/2016 |
| WO | 199908903 A1 | 2/1999 |

OTHER PUBLICATIONS

UKIPO Search Report for Application No. GB1714875.0 dated Feb. 14, 2018 (5 pages).
GB Search Report dated Aug. 29, 2018 re GB Appl. No. 1714875.0.

* cited by examiner

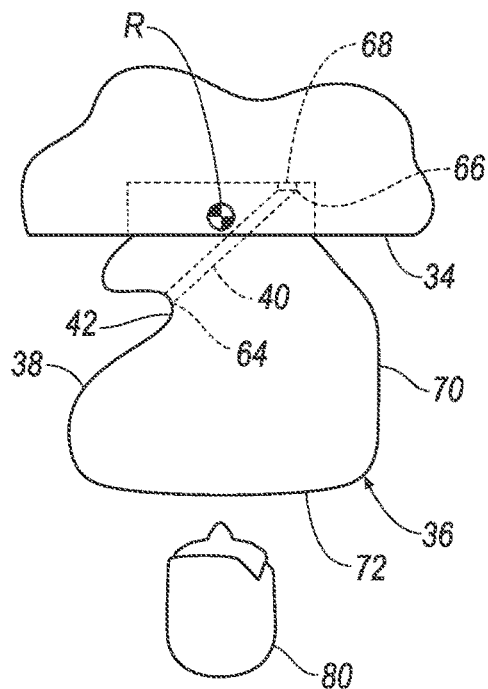
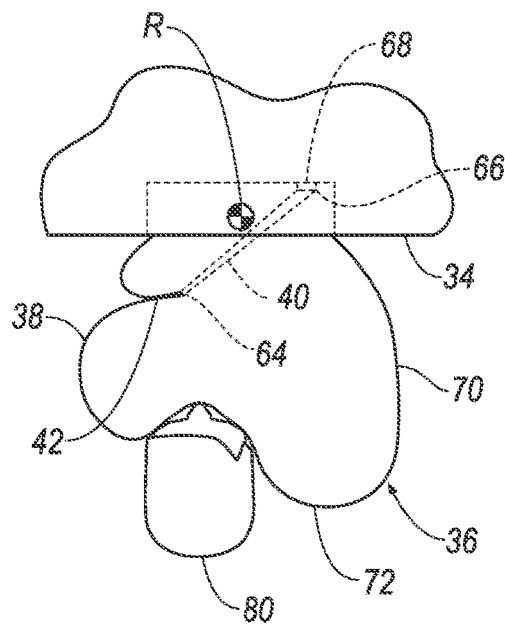
FIG. 3A            FIG. 3B
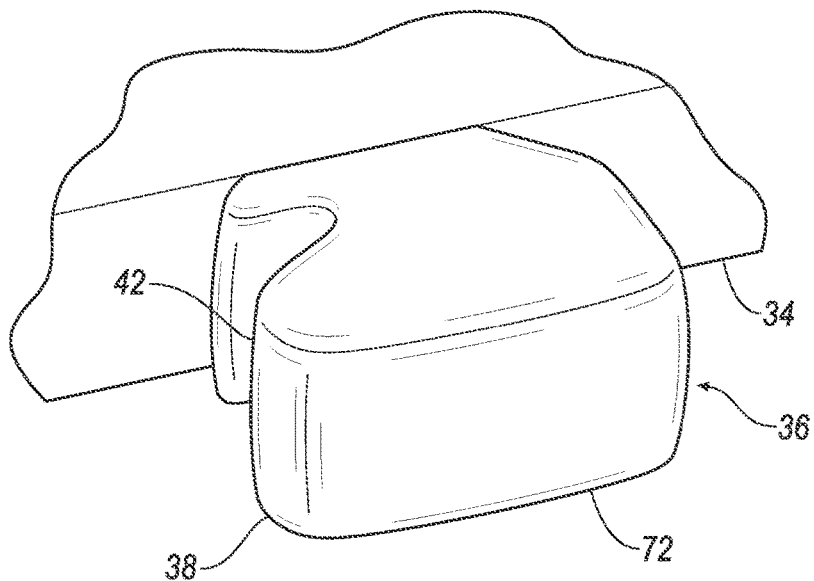
FIG. 3C

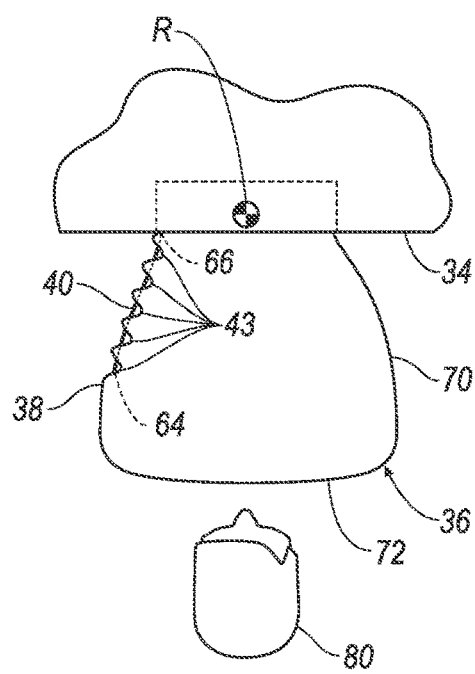
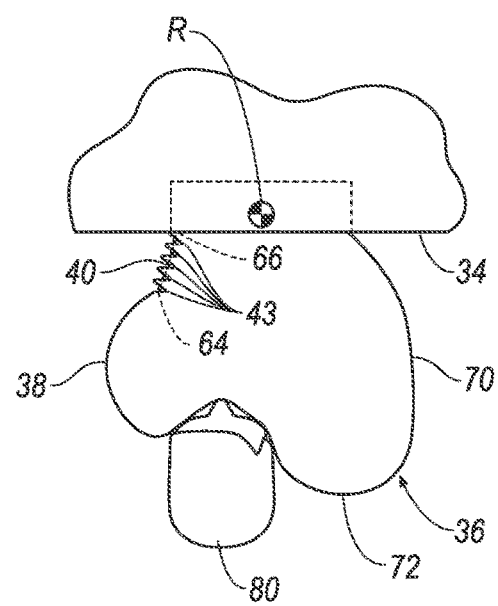
FIG. 4A  FIG.4B
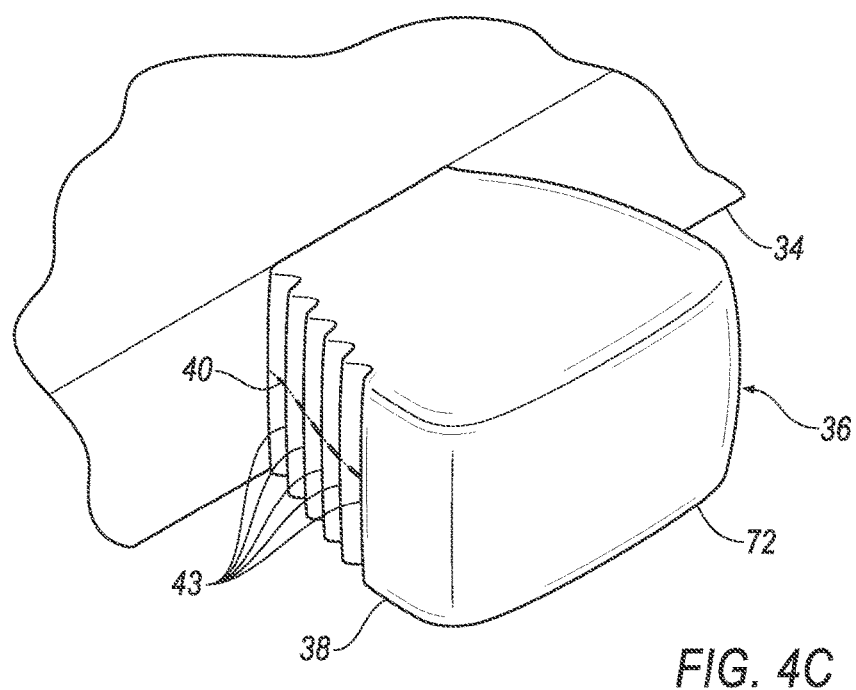
FIG. 4C

AIRBAG ASSEMBLY

BACKGROUND

Vehicles may be subject to impact testing. As one example, Federal Motor Vehicle Safety Standard (FMVSS) 208 provides a test procedure designed to simulate a frontal collision into, e.g., a wall. The test procedure provides that a test vehicle holding a test dummy as an occupant collides in a forward direction at 35 miles per hour into a stationary rigid barrier perpendicular to the path of the test vehicle. FMVSS 208 sets forth requirements for various measures of injury to the test dummy, simulating potential injury to an occupant of the vehicle, such as head injury criterion (HIC), chest deflection, and femur load.

One type of test, for example, simulates an impact to the test vehicle from another vehicle at an oblique angle. Specifically, the test procedure provides that a moving deformable barrier impacts the test vehicle with a speed of 56 miles per hour at an offset of 35% from a center of a front of the vehicle and at an angle of 15° from a vehicle-forward direction. One measurement for this test is a brain injury criterion (BrIC). The BrIC is a function of the maximum pitch, roll, and yaw of a head of the test dummy during the test, specifically, $$BrIC = \sqrt{\left(\frac{\omega_{xmax}}{66.3}\right)^2 + \left(\frac{\omega_{ymax}}{53.8}\right)^2 + \left(\frac{\omega_{zmax}}{41.5}\right)^2},$$

in which $\omega_{xmax}$ is the maximum roll velocity, $\omega_{ymax}$ is the maximum pitch velocity, and $\omega_{zmax}$ is the maximum yaw velocity, all measured in radians per second.

BRIEF DESCRIPTION OF THE DRAWINGS

FIG. 3A is a top view of a first embodiment of an airbag assembly before an impact by a dummy head.

FIG. 3B is a top view of the first embodiment of the airbag assembly after the impact by the dummy head.

FIG. 3C is a perspective view of the first embodiment of the airbag assembly before the impact by the dummy head.

FIG. 4A is a top view of a second embodiment of the airbag assembly before an impact by the dummy head.

FIG. 4B is a top view of the second embodiment of the airbag assembly after the impact by the dummy head.

FIG. 4C is a perspective view of the second embodiment of the airbag assembly before the impact by the dummy head.

DETAILED DESCRIPTION

Figures 5A, 5B:
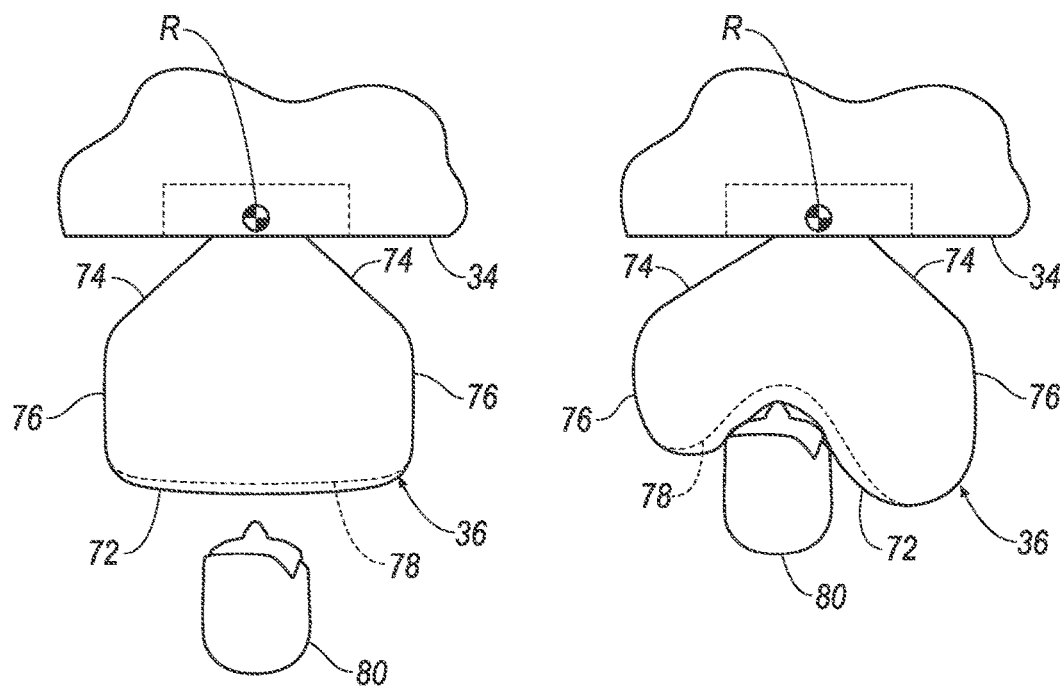
FIG. 5A is a top view of a third embodiment of the airbag assembly before an impact by the dummy head.
FIG. 5B is a top view of the third embodiment of the airbag assembly after the impact by the dummy head.
Figure 5C:
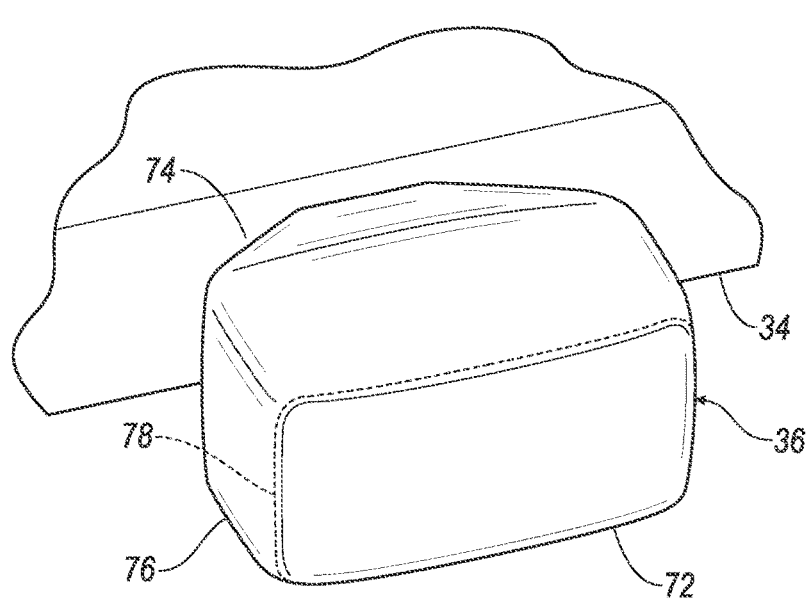
FIG. 5C is a perspective view of the third embodiment of the airbag assembly before the impact by the dummy head.

With reference to the Figures, wherein like numerals indicate like parts throughout the several views, an instrument-panel assembly 32 in a vehicle 30 includes an instrument panel 34 extending along a longitudinal axis L and an airbag 36 supported by the instrument panel 34. The airbag 36 is inflatable from an undeployed position to a deployed position. In a first embodiment and a second embodiment, the airbag 36 includes a side 38 extending in a direction transverse to the longitudinal axis L and a tether 40 attached to the side 38, and the side 38 has a fold 42, 43 when the airbag 36 is in the deployed position, as shown in FIGS. 3A-4B. Alternatively, in a third embodiment, the airbag 36 in the deployed position has a tapered shape from a vertical perspective relative to the instrument panel 34 at the instrument panel 34, as shown in FIGS. 5A-B. Common numerals are used to identify common features on the first embodiment, the second embodiment, and the third embodiment in FIGS. 3A-5B.

The ability of the airbag 36 to rotate when a head 80 of an occupant travels into the airbag 36 reduces the brain injury criterion (BrIC) during an impact, such as a frontal oblique impact. Specifically, lateral momentum of the occupant is less likely to twist the head 80 of the occupant upon traveling into the airbag 36 because the airbag 36 moves laterally with the head 80 of the occupant. Reduced twisting of the head 80 of the occupant translates to a reduced BrIC, specifically, a reduced maximum yaw $\omega_{zmax}$.

Figure 1:
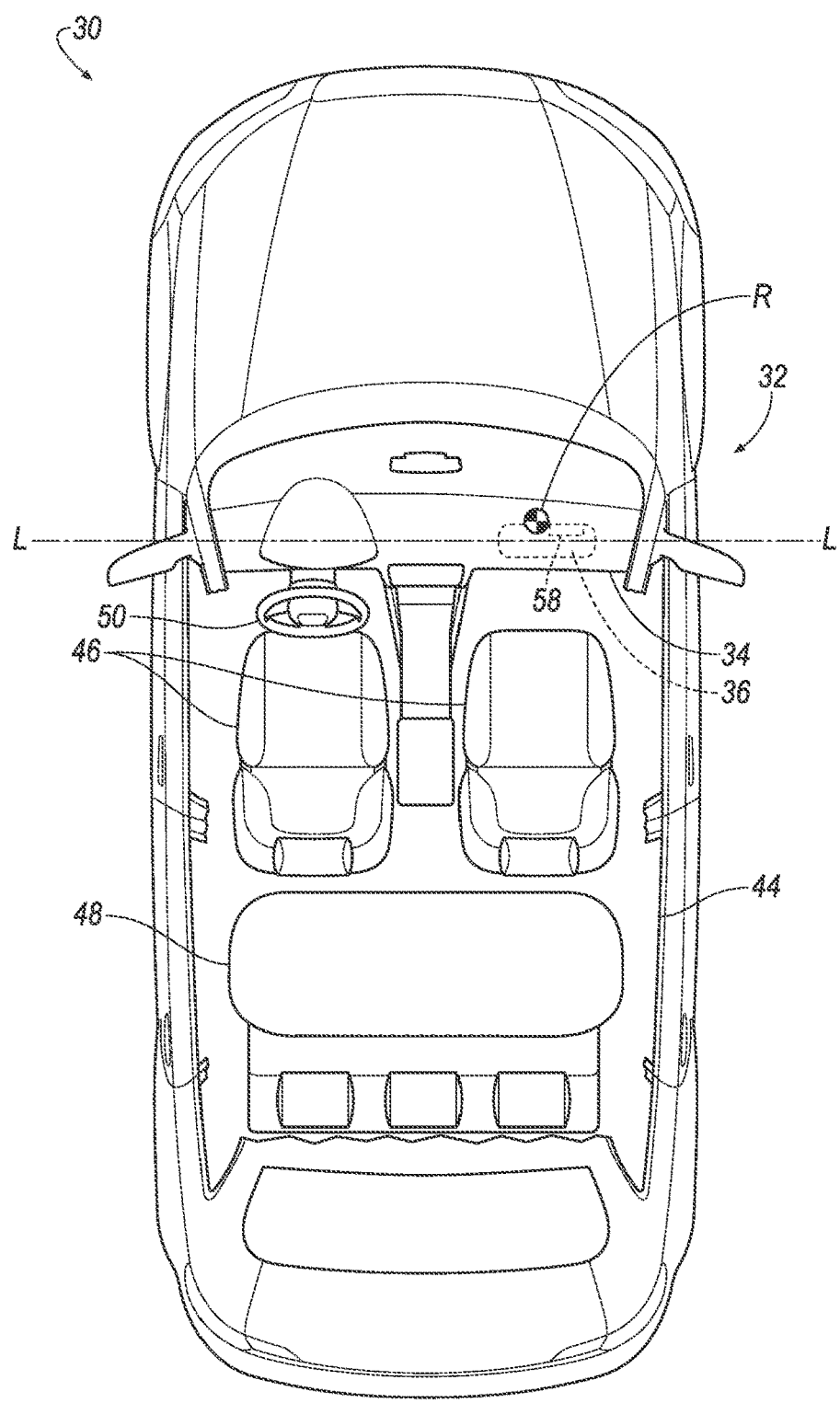
FIG. 1 is a cutaway top view of a vehicle to expose a passenger cabin for illustrative purposes.

With reference to FIG. 1, the vehicle 30 includes a passenger cabin 44 to house occupants, if any, of the vehicle 30. The passenger cabin 44 includes one or more front seats 46 disposed at a front of the passenger cabin 44 and one or more back seats 48 disposed behind the front seats 46. The passenger cabin 44 may also include third-row seats (not shown) at a rear of the passenger cabin 44. In FIG. 1, the front seats 46 are shown to be bucket seats, but the seats 46, 48 may be other types. The position and orientation of the seats 46, 48 and components thereof may be adjustable by an occupant.

The instrument panel 34 may be disposed at a forward end of the passenger cabin 44 and face toward the front seats 46. The instrument panel 34 may extend along the longitudinal axis L lateral to a forward direction of the vehicle 30. The instrument panel 34 may include vehicle controls, including a steering wheel 50.

Figure 2:
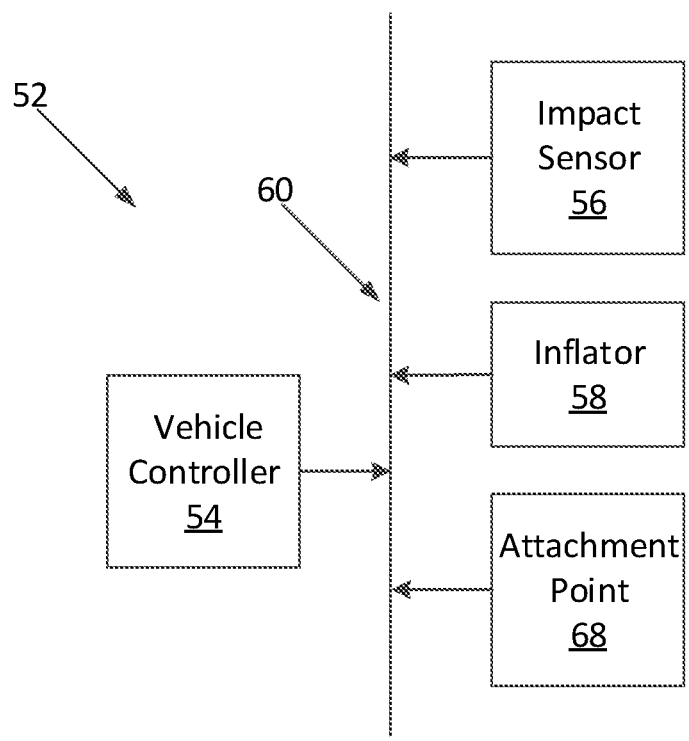
FIG. 2 is a block diagram of a control system of the vehicle.

With reference to FIG. 2, the vehicle 30 may include a control system 52. The control system 52 may include a vehicle controller 54, an impact sensor 56, an inflator 58, and in some embodiments an attachment point 68, all in communication through a communications network 60.

The control system 52 may transmit signals through the communications network 60 such as a controller area network (CAN) bus, Ethernet, Local Interconnect Network (LIN), and/or by any other wired or wireless communications network.

The vehicle controller 54 may be a microprocessor-based controller. The vehicle controller 54 may include a processor, memory, etc. The memory of the vehicle controller 54 may include memory for storing instructions executable by the processor as well as for electronically storing data and/or databases. The vehicle controller 54 may be one of multiple controllers in the vehicle 30. The vehicle controller 54 may be, for example, a restraint control module.

The impact sensor 56 may be in communication with the vehicle controller 54. The impact sensor 56 is adapted to detect an impact to the vehicle 30. The impact sensor 56 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 56 may be located at numerous points in or on the vehicle 30.

With reference to FIGS. 1 and 2, the inflator 58 may be connected to the airbag 36. Upon receiving a signal from, e.g., the vehicle controller 54, the inflator 58 may inflate the airbag 36 with an inflation medium, such as a gas. The inflator 58 may be, for example, a pyrotechnic inflator that uses a chemical reaction to drive inflation medium to the airbag 36. The inflator 58 may be of any suitable type, for example, a cold-gas inflator.

The airbag 36 may be supported by the instrument panel 34. The airbag 36 may be in fluid communication with the inflator 58. Inside the airbag 36 is an inflation chamber 62 that receives the inflation medium from the inflator 58. The airbag 36 may be inflatable from the undeployed position to the deployed position. In the undeployed position, the airbag 36 may be disposed within the instrument panel 34 and may be hidden by the instrument panel 34. In the deployed position, the airbag 36 may extend rearward from the instrument panel 34 toward one or more of the front seats 46. In other words, the airbag 36 may be a passenger airbag, as shown in the Figures. As another example, the airbag 36 may be a driver airbag supported on the steering wheel 50, or any other type of airbag mounted at any location in the vehicle 30.

The airbag 36 may be formed of any suitable airbag material, for example, a woven polymer. For example, the airbag 36 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIGS. 3A-B, the first embodiment of the instrument-panel assembly 32 may include the side 38 of the airbag 36 extending in a direction transverse to the longitudinal axis L and the tether 40 attached to the side 38.

As set forth above, the side 38 extends in the direction transverse to the longitudinal axis L when the airbag 36 is in the deployed position. The side 38 may be oriented generally vertically and generally in a direction of vehicle travel. The side 38 has the fold 42 when the airbag 36 is in the deployed position.

The airbag 36 includes the tether 40 attached to the side 38. The tether 40 extends from a first end 64 attached to the side 38 to a second end 66 attached to an attachment point 68. The tether 40 is connected to the side 38 at the fold 42 when the airbag 36 is in the deployed position. The tether 40 is shorter than a distance between the attachment point 68 and a point on the side 38 to which the tether 40 would be attached if the airbag 36 is in the deployed position without the tether 40; thus, when the airbag 36 is in the deployed position, the tether 40 may create the fold 42. The tether 40 is arranged so that the side 38 collapses when the head 80 of an occupant engages the airbag 36 in the deployed position in a direction oblique relative to the longitudinal axis L, as shown in FIG. 3B.

The attachment point 68 may be fixed relative to the instrument panel 34 and spaced from the side 38. The attachment point 68 may be, e.g., a loop around which the second end 66 of the tether 40 is fastened, a clamp gripping the second end 66 of the tether 40, a wall to which the second end 66 of the tether 40 is stitched, etc. The attachment point 68 may be located opposite the side 38 in a top view, as shown in FIG. 3A. The tether 40 may thus be arranged cross-wise or kitty corner across the airbag 36 in the deployed position. The attachment point 68 may be directly fixed to the instrument panel 34 or may be attached to intermediate components attached to the instrument panel 34. The attachment point 68 may be releasable, that is, split into components or detached from the instrument panel 34. The attachment point 68 may be released pyrotechnically, electromechanically, magnetically, etc. The attachment point 68 may be in communication with the vehicle controller 54

The airbag 36 includes a second side 70 opposite the inflation chamber 62 from the side 38. The second side 70 may be generally flat. The second side 70 may lack folds 42 or attached tethers 40.

With reference to FIGS. 4A-B, the second embodiment of the instrument-panel assembly 32 may include the side 38 of the airbag 36 extending in a direction transverse to the longitudinal axis L and the tether 40 attached to the side 38.

The airbag 36 includes the side 38 extending in the direction transverse to the longitudinal axis L when the airbag 36 is in the deployed position. The side 38 may be oriented generally vertically and generally in a direction of vehicle travel. The side 38 has a plurality of folds 43 when the airbag 36 is in the deployed position.

The airbag 36 includes the tether 40 attached to the side 38. The tether 40 extends from the first end 64 to the second end 66. The first end 64 and the second end 66 are both attached to the airbag 36, and specifically may be attached to the side 38 of the airbag 36. The tether 40 extends across the plurality of folds 43 and may be threaded through the plurality of folds 43. The tether 40 may be shorter than a distance along the side 38 between where the first end 64 and the second end 66 are attached if the tether 40 is unattached; thus, the tether 40 may create the plurality of folds 43. The tether 40 may reinforce the folds 43 to prevent the folds 43 from unravelling during deployment of the airbag 36.

The airbag 36 includes the second side 70 opposite the inflation chamber 62 from the side 38. The second side 70 may be generally flat. The second side 70 may lack folds 43 or attached tethers 40.

With reference to FIGS. 5A-B, the third embodiment of the instrument-panel assembly 32 may include the airbag 36 in the deployed position having a tapered shape from a vertical perspective relative to the instrument panel 34 at the instrument panel 34. The airbag 36 includes an impact surface 72 and a tapered section 74 and may include a side section 76.

The airbag 36 in the deployed position includes an impact surface 72 facing away from the instrument panel 34. In the event of an impact, an occupant of the front seat 46 facing the airbag 36 may travel into the impact surface 72 of the airbag 36. The impact surface 72 has a perimeter 78. The impact surface 72 may be a panel, may share a panel with the side section 76 and/or tapered section 74, or may be formed of multiple panels. The impact surface 72 is generally flat.

The tapered section 74 of the airbag 36 is a portion of the airbag 36 having the tapered shape from a vertical perspective relative to the instrument panel 34. The tapered shape of the tapered section 74 may have a wider end and a narrower end. The tapered shape of the tapered section 74 may be a frustoconical shape. The tapered section 74 is adjacent the instrument panel 34 when the airbag 36 is in the deployed position; that is, the tapered section 74 is a section of the airbag 36 that is closest to the instrument panel 34 when the airbag 36 is in the deployed position. The narrower end of the tapered section 74 may be adjacent the instrument panel 34. In a configuration in which the side section 76 is not present, then the tapered section 74 may extend completely around the perimeter 78 of the impact surface 72. The wider end may be adjacent the impact surface 72 or the side section 76.

The airbag 36 may have the side section 76 extending from the tapered section 74 to the impact surface 72. The side section 76 may extend completely around the perimeter 78 of the impact surface 72. The side section 76 may be a loop extending around the inflation chamber 62 and may have two edges, one edge adjacent the perimeter 78 of the impact surface 72 and the other edge adjacent the tapered section 74.

In the event of an oblique frontal impact, the impact sensor 56 may detect the impact and transmit a signal through the communications network 60 to the vehicle controller 54. The vehicle controller 54 may transmit a signal through the communications network 60 to the inflator 58. If the attachment point 68 is releasable and an angle of the impact is frontal, the vehicle controller 54 may transmit a signal through the communications network to the attachment point 68 to The inflator 58 may discharge and inflate the airbag 36. The airbag 36 may inflate from the undeployed position disposed in the instrument panel 34, as shown in FIG. 1, to the deployed position extended from the instrument panel 34, as shown in FIGS. 3A, 4A, and 5A. Because of the oblique angle of the impact, an occupant of the front seat 46 facing the airbag 36 will have a momentum at an oblique angle from a vehicle-forward direction, that is, the occupant will have both forward momentum and lateral momentum relative to the vehicle-forward direction. The occupant, specifically, the head 80 of the occupant, may travel forward into the airbag 36. The lateral momentum of the occupant may cause the airbag 36 to rotate about a rotational axis R, as shown in FIGS. 3B, 4B, and 5B. The rotational axis R extends vertically relative to the instrument panel 34. Specifically, in the first embodiment, the momentum of the occupant combined with the fold 42 caused by the tether 40 makes the side 38 collapse relative to the second side 70, rotating the airbag 36. In the second embodiment, the momentum of the occupant combined with the plurality of folds 43 caused by the tether 40 makes the side 38 collapse relative to the second side 70, rotating the airbag 36. In the third embodiment, the tapered shape of the airbag 36 allows the airbag 36 to rotate about the rotational axis R before reacting against the instrument panel 34. The rotation of the airbag 36 may absorb some of the lateral momentum of the occupant, reducing the possibility and/or amount that the head 80 of the occupant may be twisted relative to the airbag 36.

In the event of a head-on frontal impact, the impact sensor 56 may detect the impact and transmit a signal through the communications network 60 to the vehicle controller 54. The vehicle controller 54 may transmit a signal through the communications network 60 to the inflator 58. If the attachment point is releasable, the vehicle controller 54 may also transmit a signal through the communications network to the attachment point 68 to release the tether. The inflator 58 may discharge and inflate the airbag 36. The attachment point 68 may release the tether 40. An occupant of the front seat 46 facing the airbag 36 will have momentum in a vehicle-forward direction and may travel into the airbag 36. The airbag 36 does not have any rotational bias as described above and may cushion the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An instrument-panel assembly comprising:
   an instrument panel extending along a longitudinal axis; and
   an airbag supported by the instrument panel and inflatable from an undeployed position to a deployed position, the airbag including
      a side extending in a direction transverse to the longitudinal axis, the side having a plurality of folds when the airbag is in the deployed position; and
      a tether attached to the side;
   wherein the tether extends across the plurality of folds.

2. The instrument-panel assembly of claim 1, further comprising an attachment point fixed relative to the instrument panel, wherein the tether extends from a first end attached to the side to a second end attached to the attachment point.

3. The instrument-panel assembly of claim 2, wherein the tether is connected to the side at one of the folds when the airbag is in the deployed position.

4. The instrument-panel assembly of claim 2, wherein the attachment point is spaced from the side.

5. The instrument-panel assembly of claim 2, wherein the tether is arranged so that the side collapses when a head of an occupant engages the airbag in the deployed position in a direction oblique relative to the longitudinal axis.

6. The instrument-panel assembly of claim 2, wherein the airbag includes a second side opposite an inflation chamber from the side, wherein the second side is generally flat.

7. The instrument-panel assembly of claim 1, wherein the tether is threaded through the side at the folds.

8. The instrument-panel assembly of claim 1, wherein the tether extends from a first end to a second end spaced from the first end, the first and second ends being attached to the airbag.

9. The instrument-panel assembly of claim 1, wherein the tether extends from a first end to a second end spaced from the first end, the first and second ends being attached to the side of the airbag.

10. The instrument-panel assembly of claim 1, wherein the airbag includes a second side opposite an inflation chamber from the side, wherein the second side is generally flat.

11. An instrument-panel assembly comprising:
    an instrument panel extending along a longitudinal axis;
    an airbag supported by the instrument panel and inflatable from an undeployed position to a deployed position, the airbag including
       a side extending in a direction transverse to the longitudinal axis, the side having a fold when the airbag is in the deployed position; and
       a tether attached to the airbag at the side and to the instrument panel at a releasable attachment point; and
    a vehicle controller in communication with the attachment point and programmed to release the attachment point based on detecting a non-oblique frontal impact.

12. The instrument-panel assembly of claim 11, wherein the tether is connected to the side at the fold when the airbag is in the deployed position.

13. The instrument-panel assembly of claim 11, wherein the attachment point is spaced from the side.

14. The instrument-panel assembly of claim 11, wherein the tether is arranged so that the side collapses when a head of an occupant engages the airbag in the deployed position in a direction oblique relative to the longitudinal axis.

15. The instrument-panel assembly of claim 11, wherein the airbag includes a second side opposite an inflation chamber from the side, wherein the second side is generally flat.

16. The instrument-panel assembly of claim 11, wherein the side has a plurality of folds including the fold.

17. The instrument-panel assembly of claim 16, wherein the tether extends across the plurality of folds.

18. The instrument-panel assembly of claim 17, wherein the tether is threaded through the side at the folds.

19. The instrument-panel assembly of claim 17, wherein the airbag includes a second side opposite an inflation chamber from the side, wherein the second side is generally flat.

* * * * *